April 5, 1960     R. L. UPHOFF ET AL     2,931,979
ELECTRONIC DIGITAL RATIO TACHOMETER
Filed Aug. 8, 1955     4 Sheets-Sheet 1

INVENTORS
RUSSEL L. UPHOFF
EDWARD FLOWERS
BY *Gerald R. O'Brien*
ATTORNEY

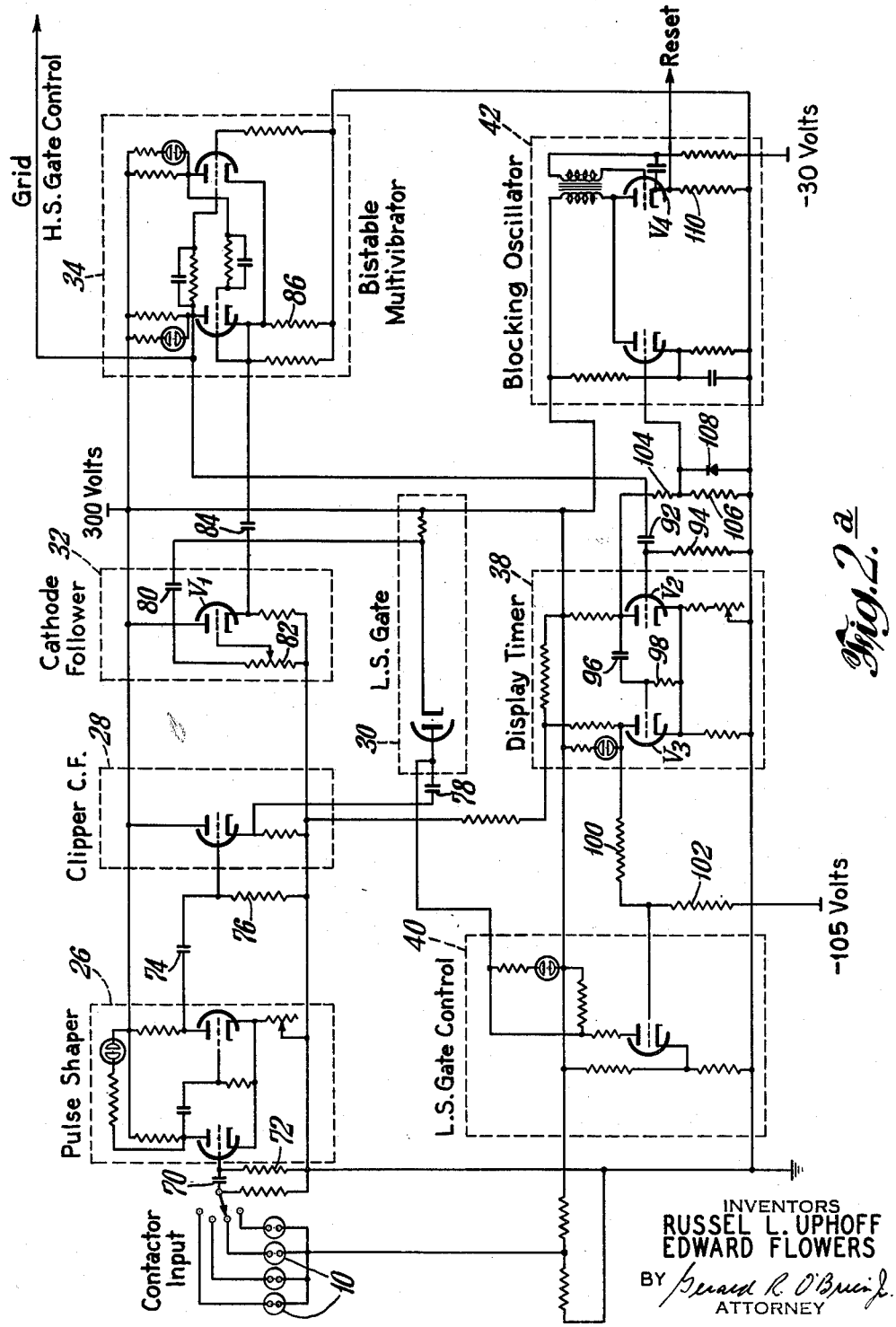

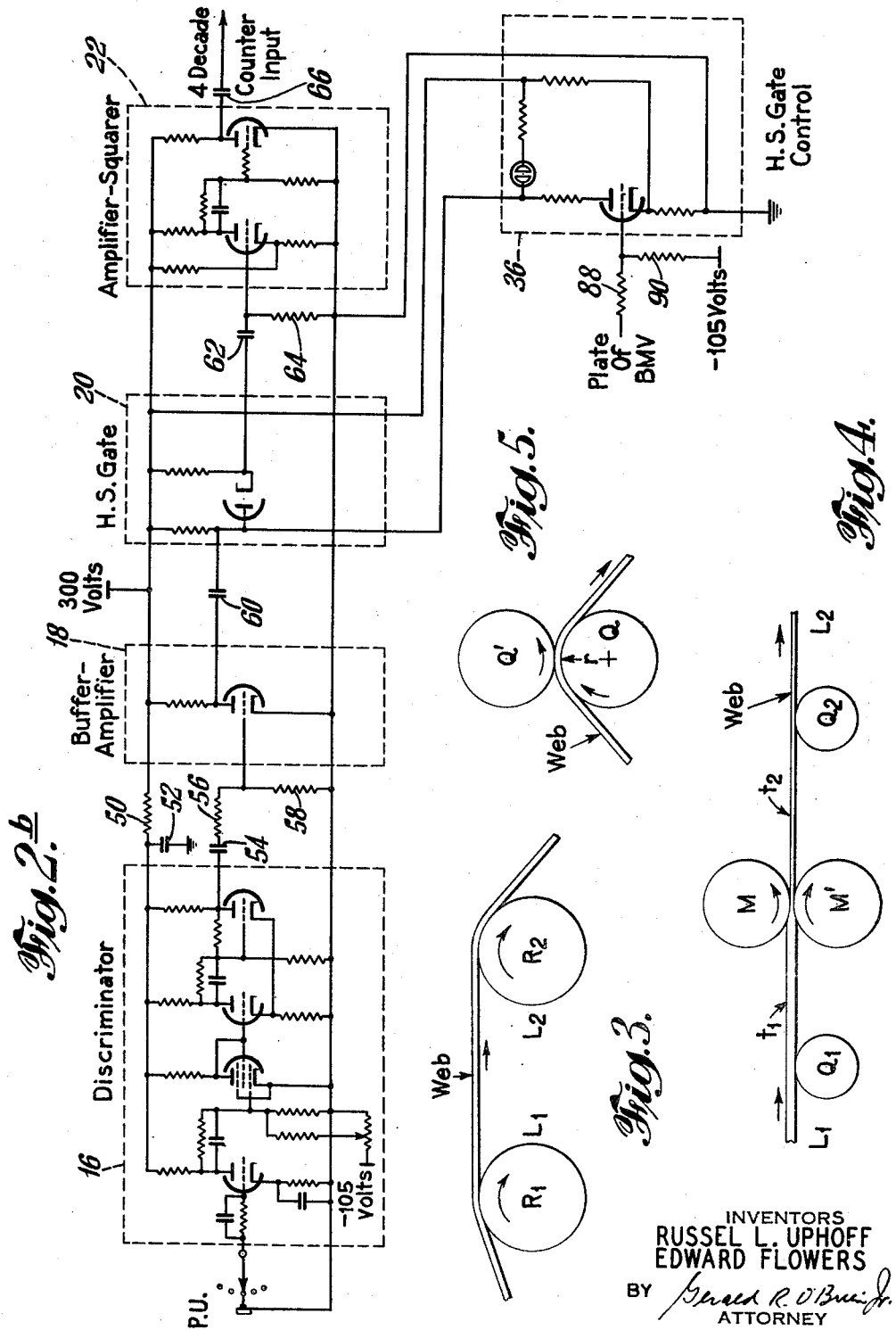

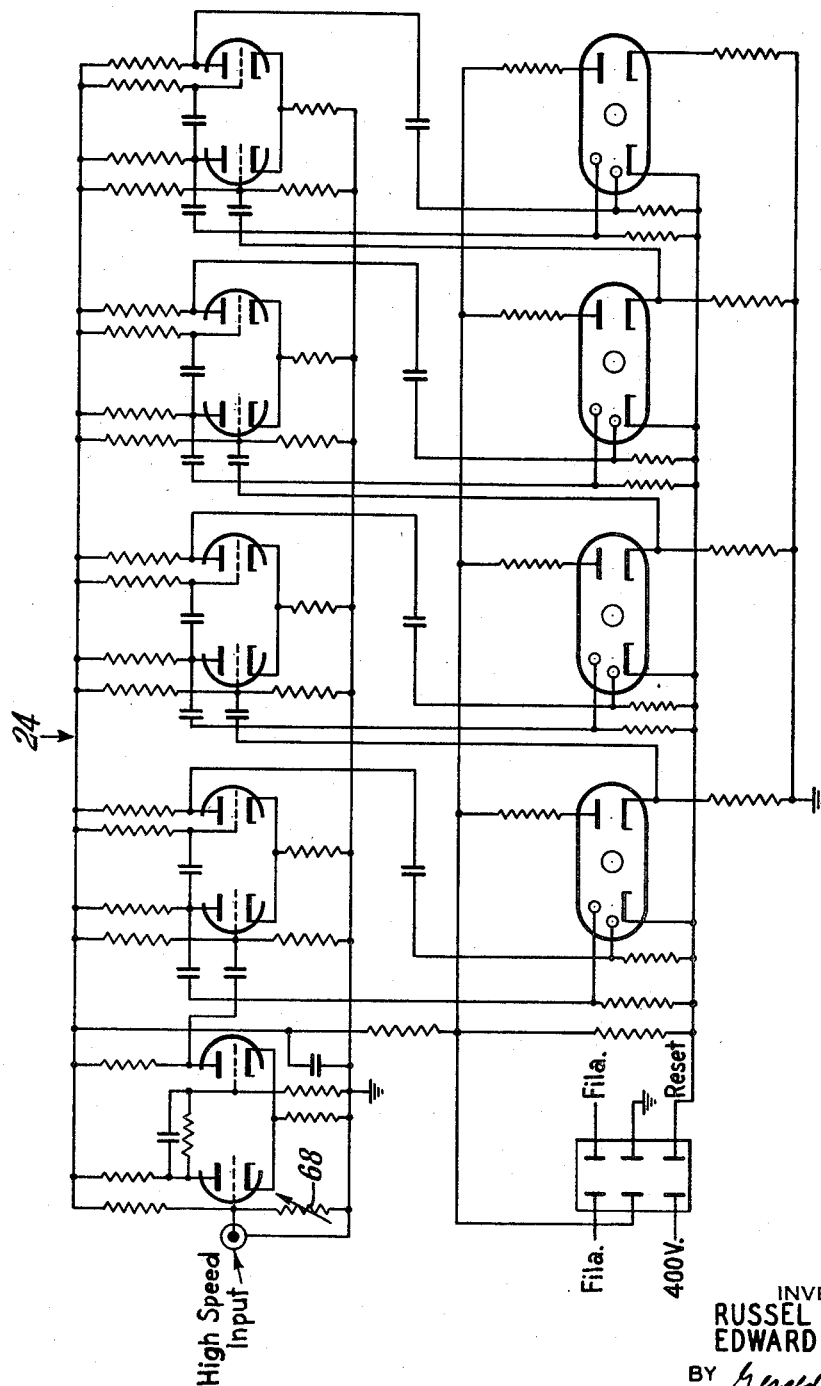

United States Patent Office 2,931,979
Patented Apr. 5, 1960

2,931,979
ELECTRONIC DIGITAL RATIO TACHOMETER

Russel L. Uphoff, Murrysville, Pa., and Edward Flowers, South Plainfield, N.J., assignors to Union Carbide Corporation, a corporation of New York Application August 8, 1955, Serial No. 526,874

7 Claims. (Cl. 324—69)

The present invention relates to an electronic digital ratio tachometer.

In many commercial operations involving passage of a continuum of material, such as sheet, ribbon, filament or the like, through a series of roll sections in which the individual rolls rotate at variable speeds with respect to each other, it is essential that the speed of each roll relative to every other roll in the series be controlled within narrow limits. This need arises from the fact that the strains introduced into the material depend primarily on the amount of stretch imparted to it; and the amount of stretch which takes place across any span is governed by the relative speeds of the two rolls limiting that span. The roll speed ratio also influences the cross-sectional contour of the web, e.g., thickness, necking-down, and the like.

Rolling operations of the type described above are employed in the manufacture of paper, metal sheet and foil, textile fibers, monofilaments, and plastic film and sheet, in the continuous roll embossing of thermoplastics, and in many other industrial processes which require controlled stretch.

Heretofore, the ratio of two roll speeds was determined by measuring the speed of each roll with a hand tachometer and computing the ratio. Hand tachometers are disadvantageous for the following reasons: (a) their precision is inadequate for many applications; (b) rotating members are frequently inaccessible when in operation; (c) either the operator must scurry back and forth between the two rolls while their speeds are being adjusted, or two operators are required; and (d) the ratio computation is subject to operator error.

Electrical ratio tachometers of the analogue type have also been employed for measuring the ratio of two roll speeds. Such instruments have the following shortcomings: (a) limited range—the maximum range of measurable roll speeds in any pair is only about 6:1; (b) limited accuracy—the accuracy is about 1% of the full scale value. Since this is an analogue type instrument, the absolute accuracy remains constant; and the relative accuracy therefore becomes progressively poorer at lower speed ratios. For example, if the scale reads to 600 (expressing a 6:1 ratio in percent), it may be read to about ±6. While this is 1% of the value being measured for speed ratios in the neighborhood of 6:1, it is 6% of the value being measured for speed ratios in the neighborhood of 1:1; and (c) a complete measuring system is required for each pair of rolls except under the very special circumstance in which each roll of the pair is operating within exactly the same speed range as the corresponding roll of the other pair(s).

Accordingly, it is the main object of the present invention to provide a direct-reading electronic ratio tachometer of the digital type which has a high accuracy over a wide range of different roll speeds.

Another object is to provide such an electronic digital ratio tachometer in which the accuracy of the instrument is essentially independent of the absolute roll speeds.

Other aims and advantages of the invention will be apparent from the following description and appended claims.

In the drawings:

Fig. 2a is an electric circuit diagram of a portion of an apparatus embodying the invention;

Fig. 2b is an electric circuit diagram of the remainder of the apparatus of Fig. 2a;

Fig. 2c is an electric circuit diagram of the decade counter employed in conjunction with the apparatus of Figs. 2a and 2b; and Figs. 3, 4 and 5, are schematic diagrams of representative web and roll arrangements which may be employed in conjunction with the apparatus of the invention for measuring the ratios between the speeds of rotation of the rolls in the various arrangements employed.

Figure 1:
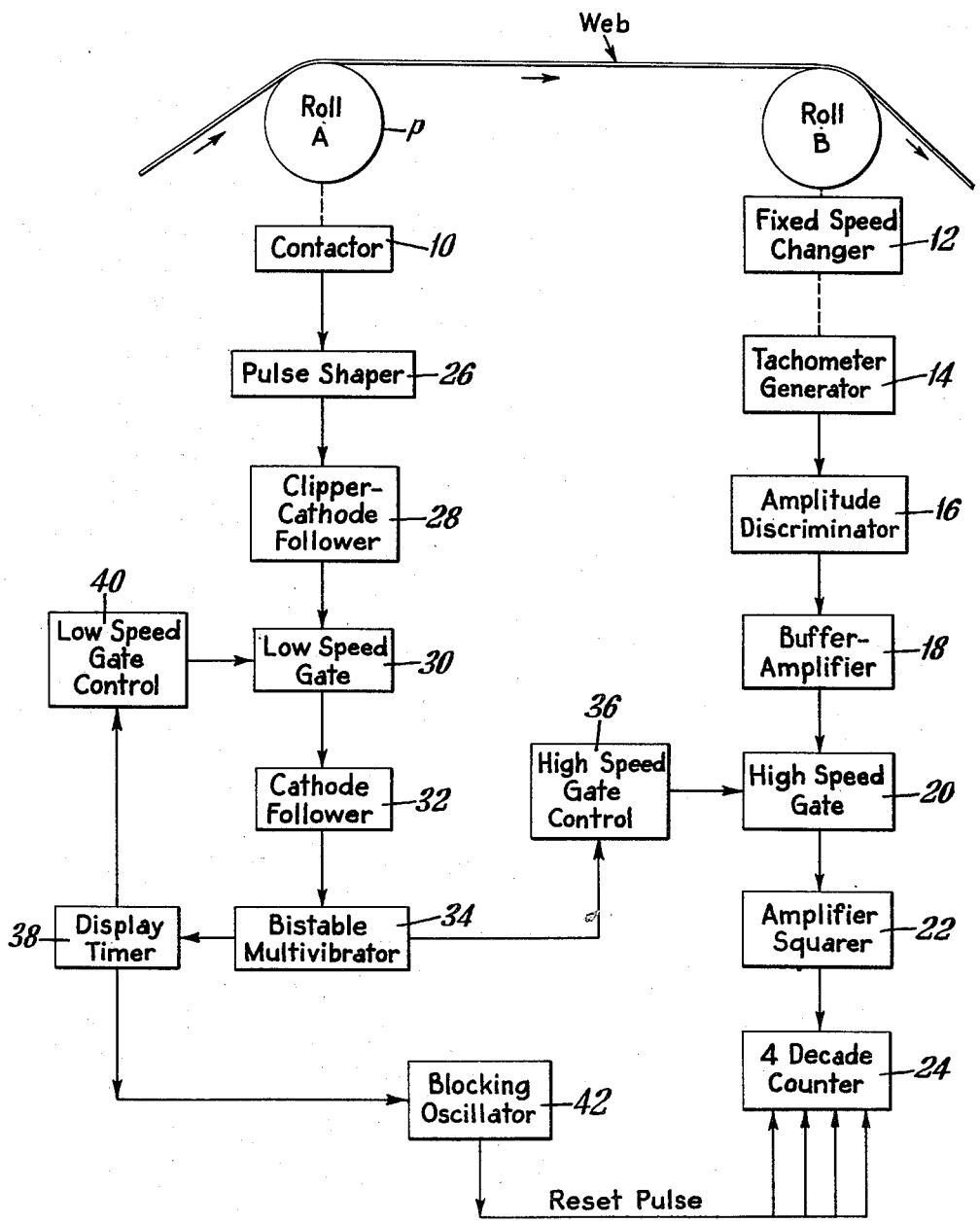
Fig. 1 is a schematic diagram of apparatus embodying the invention.

While electronic counters are well known, existing types have been employed either as counters, by feeding a standard slow time-base signal to open and close a counting gate while a number of events are being totaled, or as timers, by feeding a standard high-speed pulse to the counter while opening and closing the gate by a switching pulse developed by the object being timed. The ratio tachometer of the invention combines these two functions, i.e. counting and timing.

In accordance with the present invention, a switching pulse is developed by a contactor driven by one roll of the pair of rolls with respect to which the ratio of rotational speeds is desired. A series of high-speed pulses is developed by a tachometer generator driven by the other roll of the pair. The number of pulses supplied by the tachometer generator per revolution of the second roll is known and, by measuring the number of such pulses passing to a counter while the first roll is making one revolution, establishes the ratio between the two roll speeds directly.

Referring specifically to Fig. 1 of the drawing, the reference roll A, having a circumference $p$, is provided with a rotating contactor 10 so that an electrical pulse is produced for each revolution of the roll A. Roll B is provided with a fixed speed changer 12 and tachometer generator 14 so that, let us say, 1000 pulses are produced when the surface of roll B travels a distance equal to $p$. If the linear velocity of roll A is $w$ and of roll B is $w'$ and the counting interval $t$ is taken as the time required for roll A to make one revolution, then:

(1) $$t = p/w$$

During this interval the surface of roll B travels a distance D such that:

(2) $$D = tw' = pw'/w$$

and C, the number of tachometer generator pulses—or counts—issued during this inverval, is given by:

(3) $$C = 1000 \, (w'/w)$$

The count therefore represents the ratio of the roll speeds expressed directly in tenths of a percent.

The use of a contactor arranged to give one pulse per revolution is of course arbitrary. Such an arrangement is particularly convenient with roll speeds of about 60 r.p.m., giving a counting interval of about one second. Other contactor arrangements may be used to accommodate other roll speeds or to provide other counting intervals. In any case, if an accuracy of 0.1% (i.e. one part in a thousand) is required, the ratio of the pulse rates, taken at equal roll speeds, must be 1000:1. Greater or lesser accuracies may be provided for by changing the pulse ratio. Thus, Equation 3 may be written in more general form as (3–a) $\qquad C'=Kw'/w$ where K is the pulse ratio and C' the count which now expresses the roll speed ratio directly in "(100/K)ths" of a percent.

The high-speed signal from tachometer generator 14 is fed to the amplitude discriminator circuit 16 which develops output pulses of constant amplitude and rise time regardless of the input wave form. These output pulses are then passed through buffer-amplifier circuit 18 to the high-speed gate diode circuit 20. The buffer-amplifier circuit further amplifies the pulses fed to it and prevents the operation of the high-speed gate circuit 20 from reflecting back into the amplitude discriminator circuit 16. High-speed pulses passing through the high-speed gate circuit 20 are passed through amplifier-squarer circuit 22 to the decade counter circuit 24. The amplifier-squarer circuit serves to further shape and amplify the high-speed pulses.

The low-speed signal developed by the rotating contactor 10 is concurrently fed to pulse shaper circuit 26 which is a monostable multivibrator circuit which generates high amplitude output pulses in response to the low-speed signals fed to it from contactor 10. These high amplitude pulses are fed through a clipper-cathode follower circuit 28, which serves to remove the negative half-cycles of the pulses, to the low-speed gate diode circuit 30. The low-speed pulses passing through low-speed gate circuit 30 then pass through cathode follower circuit 32 to a bistable multivibrator 34. The cathode follower circuit serves as a buffer preventing spurious signals from reflecting back into low-speed gate circuit 30 and provides the low impedance output necessary for triggering the bistable multivibrator circuit 34.

The action of the bistable multivibrator, which has two stable states, governs the action of both the high-speed gate control diode circuit 36 which serves to control the operation of high-speed gate circuit 20, and the display timer circuit 38 which comprises a monostable multivibrator. This monostable multivibrator activates both the low-speed gate control circuit (diode) 40 which controls the low-speed gate 30, and the blocking oscillator circuit 42, which serves to reset decade counter 24 after each reading.

The following is a consideration of the operation of the apparatus of Fig. 1 of the drawings through a complete cycle:

At the start of the cycle, the counter 24 reads zero, the high speed gate 20 is in a closed or non-conducting position, i.e., high speed pulses can not pass through to the counter, and the low speed gate 30 is in its open or conducting position. The first low speed pulse from the contactor 10 passes through the low speed gate 30 to the bistable multivibrator 34 which opens the high speed gate 20, thus allowing the high speed signals from the tachometer generator 14 to enter the counter 24. The next low speed pulse from the contactor 10 passes through the low speed gate 30 to the bistable multivibrator 34 which both closes the high speed gate 20 thus terminating the count, and simultaneously starts the action of the display timer 38. The display timer 38, a monostable multivibrator, immediately closes the low speed gate 30 thereby preventing any signals from reaching the bistable multivibrator 34. The high speed gate 20 is thus kept closed and the reading on the decade counter 24 therefore remains undisturbed during the display interval, about 2–5 seconds. At the end of this period, the display timer 38 both triggers the blocking oscillator 42 which resets the counter to zero, and also reopens the low speed gate 30. The next low speed signal issuing from the contactor 10 therefore passes through this gate 30 to the bistable multivibrator 34 and the cycle is repeated.

The following example illustrates in detail, referring specifically to Figs. 2a, 2b and 2c of the drawings, circuitry for performing the above-described operation. In so far as the several component circuits used in this example are well known per se, they are not described in detail, but coupling circuit components and component circuits critical to the operation of the apparatus are set forth quantitatively. For the sake of completeness, however, the complete circuits are included in the drawings with the exception of the power supply.

As shown in the drawing, except where otherwise specified, all resistors are 1 watt carbon 10%; all condensers marked in whole numbers are in micromicrofarads, 600 working volts; all condensers in decimal numbers are microfarads, 600 working volts; all variable resistors are 2 watt carbon; and all neon bulbs are NE–2.

The reference roll A, having a circumference p, is provided with rotating contactor 10 (such as a Veeder-Root rotating switch or its equivalent) so that one electrical pulse is produced for each revolution of roll A. Roll B is provided with a 1:10 gear box 12 and tachometer generator 14 (such as a Hewlett-Packard tachometer generator model No. 508B or its equivalent) which consists of a 100 tooth gear and magnetic pickup so that 1000 pulses are produced when the surface of roll B travels a distance equal to p.

The signal from roll B is fed into an amplitude discriminator 16 (such as a Hewlett-Packard amplitude discriminator No. 522B–58 or its equivalent) consisting of a two-stage amplifier followed by a "Schmidt Trigger" circuit. The amplitude discriminator 16 provides an output pulse of constant amplitude and rise time regardless of the input wave form. This unit is adjusted so it will not respond to input signals below 0.2 volt in order to eliminate spurious pickup. The 300 volt supply to the amplitude discriminator 16 is decoupled through a filter consisting of a 4000 ohm, 10 watt resistor 50 the discriminator end of which is bypassed to ground by an 8 mfd. electrolytic condenser 52. This decoupling filter prevents the action of the amplitude-discriminator 16 from reflecting back into the power supply and appearing as spurious signals in other circuits supplied by this same 300 volt source.

The output of the "Schmidt Trigger" circuit is applied across a voltage divider consisting of a 0.01 mfd. condenser 54, a 220,000 ohm resistor 56 and a 56,000 ohm resistor 58 connected in series in that order going from the plate of the "Schmidt Trigger" circuit to ground. The voltage at the point between the two resistors is applied to the grid of a buffer-amplifier 18. The buffer-amplifier 18 further amplifies the signal and prevents operation of the high speed gate 20 from reflecting back into and thereby disturbing the operation of the discriminator 16.

The amplified signal is conducted through a 0.001 mfd. condenser 60 to the plate of the high speed gate diode. When the high speed gate 20 is in a conducting position, which positioning is governed by a high speed gate control 36, the operation of which is described subsequently, the signal appears at the cathode of the high speed gate diode.

This voltage from the gate diode cathode is applied across a voltage divider consisting of a 0.005 mfd. condenser 62 and a 330,000 ohm resistor 64 connected in that order going from cathode to ground, and the voltage at the point between this condenser 62 and resistor 64 of the coupling circuit is applied to the grid of an amplifier-squarer 22, such as Eeco Production Co. amplifier-squarer Z–90001 (1954 catalogue) or its equivalent. The width of the pulse entering the amplifier-squarer is controlled by the time constant of this coupling circuit. The amplifier-squarer input pulse may therefore be broadened or sharpened as desired, within limits, by respectively increasing or decreasing this time constant. This can be done by respectively increasing or decreasing the capacitance of the condenser 62 and/or the resistance of the resistor 64.

The amplifier-squarer 22 further amplifies and shapes the signal. The output of the amplifier-squarer is applied across a voltage divider consisting of a 0.1 mfd. condenser 66 and a 1 megohm variable resistor 68 connected in series in that order going from amplifier-squarer plate to ground. The voltage at the point between the condenser 66 and variable resistor 68 is applied to the input of a suitable counter 24. For this purpose, a four decade Glow Transfer Counter (similar to the Atomic Instrument Co. six decade counter, model No. 162A) may be employed.

As already indicated, roll A is provided with a rotating contactor 10 which produces one pulse for each revolution of roll A. The pulse from the contactor 10 is applied to a voltage divider consisting of a 0.05 mfd. condenser 70 and a 1 megohm resistor 72 connected in series in that order going from contactor output to ground. The voltage at the point between the condenser 70 and resistor 72 is applied to the grid of a pulse shaper 26, such as Eeco Production Co. monostable multivibrator Z–8318 (1954 catalogue) or its equivalent. It generates a high amplitude pulse of uniform shape when triggered by the low speed signal from the contactor 10.

The output of the pulse shaper 26 is applied across a voltage divider consisting of a 0.001 mfd. condenser 74 and a 150,000 ohm resistor 76 connected in series in that order going from pulse shaper plate to ground, and the voltage at the point between the condenser 74 and resistor 76 is applied to the grid of a clipper-cathode follower 28. The clipper-cathode follower 28 removes the negative pulse from the differentiated signal issuing from the pulse shaper 26. The signal from the cathode of the clipper is coupled through a 0.01 mfd. condenser 78 to the plate of a low speed diode gate 30.

When the low speed gate 30 is in a conducting position, which positioning is governed by a low speed gate control 40 whose operation is described subsequently, the signal appears at the cathode of the low speed gate diode. The signal from the low speed gate diode cathode is coupled through a 0.05 mfd. condenser 80 to the high end of a 1 megohm potentiometer 82 the other end of which is grounded. The movable contact of the potentiometer is connected to the grid of a cathode follower triode (V1). The 1 megohm potentiometer 82 therefore serves as a gain control in the grid circuit of the cathode follower 32.

The cathode follower 32 acts as a buffer preventing spurious signals from reflecting back into the low speed gate 30 and provides the low impedance output necessary for triggering the Eccles-Jordan circuit 34, such as Eeco Production Co. bistable multivibrator Z–91000 or its equivalent. This low impedance output from the cathode of the cathode follower 32 is applied across a voltage divider consisting of a 0.1 mfd. condenser 84 and 22,000 ohm resistor 86 connected in series in that order going from cathode to ground, and the voltage at a point between the condenser 84 and resistor 86 is applied to the input (coupled cathodes) of the bistable multivibrator 34. This 22,000 ohm resistor 86 also serves, therefore, as the cathode bias resistor for the bistable multivibrator 34.

The bistable multivibrator, as the name implies, has two genuine stable states which are defined by conduction in either of its two tubes with the other cut off, and all other conditions are entirely unstable. Successive incoming pulses from the cathode follower 32 "flip-flop" it alternately from one stable condition to the other; and it therefore provides the dividing action necessary for the operation of a display timer 38 and a high speed gate control 36.

The output of the bistable multivibrator 34 is direct coupled to the grid of the high speed gate control 36 by applying said output voltage to a voltage divider consisting of a 270,000 ohm resistor 88 and a 180,000 ohm resistor 90 connected in series in that order from the bistable multivibrator plate to a −105 volt D.C. supply and applying the voltage at the point between these two resistors to the grid of the high speed gate control 36. The direct coupled voltage divider is connected to a −105 volt D.C. supply rather than ground in order to provide the correct negative grid bias necessary for the proper operation of the high speed gate control 36. The high speed gate control alternately positions the high speed gate 20 to pass or reject pulses from the buffer-amplifier 18 according as the signal it (the high speed gate control) receives from the bistable multivibrator 34 is of relatively lower or higher voltage, respectively.

The output of the bistable multivibrator is also applied across a voltage divider consisting of a 0.01 mfd. condenser 92 and a 270,000 ohm resistor 94 connected in series in that order going from bistable multivibrator plate to ground, and the voltage at the point between the condenser 92 and resistor 94 is applied to the input of a monostable multivibrator which acts as a display timer 38. The monostable multivibrator 38 provides a pulse of relatively long duration, say several seconds. This is accomplished by properly fixing the time constant of the grid circuit of the second tube (V3) to prevent rapid decay of the negative grid-blocking potential by employing both a condenser 96 of relatively large capacitance, e.g., 2.0 mfd., in the coupling circuit between the plate of the first triode tube (V2) and the grid of the second (V3) triode tube, and also a relatively large resistance 98, e.g., 2 megohms, as the grid leak for the second triode tube (V3) where V2 and V3 are the two halves of a 6SN7 twin triode tube.

The output of the display timer 38 is direct coupled to the grid of a low speed gate control 40 by applying said output voltage to a voltage divider consisting of a 220,000 ohm resistor 100 and a 180,000 ohm resistor 102 connected in series in that order going from display timer plate to a −105 volt D.C. supply and applying the voltage taken at the point between these two resistors to the grid of the low speed gate control 40. The direct coupled voltage divider is coupled to a −105 volt D.C. supply rather than ground in order to provide the correct negative grid bias necessary for proper operation of the low speed gate control. The low speed gate control 40 alternately positions the low speed gate 30 to pass or reject pulses from the clipper-cathode follower 28 according as the signal it (the low speed gate control) receives from the display timer 38 is of relatively lower or higher voltage, respectively.

The voltage at the plate of the first tube (V2) of the display timer 38 is applied to a voltage divider consisting of a 47,000 ohm resistor 104 and a 100,000 ohm resistor 106 connected in series in that order going from plate to ground, and the voltage at the point between these two resistors is applied to the input of a blocking oscillator 42. Since the blocking oscillator might be triggered by a negative pulse, the input grid of the blocking oscillator 42 is connected to the negative terminal of a 1N34 crystal diode 108 whose positive terminal is grounded. The crystal diode 108 short circuits negative pulses from the display timer 38 which would otherwise appear at the input of the blocking oscillator 42 and interfere with its proper operation.

The voltage at the plate of the first tube (V2) of the display timer 38 is 180° out of phase with the display timer output which goes to the low speed gate control 40. Thus, when a positive pulse, i.e., relatively higher voltage, appears at the input of the low speed gate control causing the low speed gate 30 to be closed, a negative pulse appears at the plate of the first tube (V2) of the display timer—but is prevented from appearing at the input of the oscillator 42 by the crystal diode 108. When a negative pulse, i.e., relatively lower voltage, appears at the input of the low speed gate control causing the low speed gate to be opened, a positive pulse appears at the input of the blocking oscillator 42 and triggers it.

The triggering of the blocking oscillator causes a pulse of less than 100 microseconds duration to develop across the cathode bias resistor 110 of the output cathode follower (V4) of the blocking oscillator 42. By directly connecting this cathode to the number one cathodes of each of the GC10B counter tubes in the counter 24, this pulse is used to reset the counter to zero.

It is, of course, to be understood that many commercially available units may alternatively be employed for the component and coupling circuits of the apparatus of the invention described hereinabove. In addition, other commercially available decade counters can be employed in place of that shown in the drawing. Many of such other decade counters are such as to make auxiliary amplification and clipping of the high and low speed signals unnecessary.

As in any digital instrument the basic accuracy is $\pm 1$ count, which corresponds to $\pm 0.1\%$ when the pulse ratio is 1000:1. The accuracy, sensitivity and precision can be increased as desired by increasing the pulse ratio. This can be accomplished by increasing the number of high speed pulses per revolution either by increasing the gear ratio or by employing a higher pulse rate tachometer generator or both. Thus, for a one second counting interval the accuracy could be increased to $\pm 0.01\%$ to $\pm 0.001\%$ or etc. up to $\pm 0.00015\%$ (1 part in 670,000) based on currently available tachometer generators. Still higher accuracies may be provided where necessary by simultaneously increasing the counting interval, which may be done by altering the gear and/or contactor arrangement on the reference roll. Conversely, where lesser degrees of accuracy, sensitivity and precision may suffice, some economy may be effected by decreasing the pulse ratio via decreased gear ratios or the use of lower pulse rate tachometer generators.

The electronic digital ratio tachometer herein described is useful in many ways. For example, it can be used to measure the degree of stretch or elongation introduced into the web between any two points in a process. Thus, within the limits that no slippage occurs between the web and rolls $R_1$ and $R_2$ of Fig. 3 of the drawings, the elongation E, expressed in percent effected between the rolls $R_1$ and $R_2$ is equal to $$\left(\frac{L_2}{L_1} - 1\right) \times 100$$

where $L_2$ and $L_1$ represent the surface velocities of rolls $R_2$ and $R_1$, respectively. Rolls $R_1$ and $R_2$ may represent two rolls already present in the assembly or a pair of idler (or tension or "billy") rolls installed especially for this purpose in such fashion that they are friction driven by the traveling web. By measuring the ratio $L_2/L_1$ as previously described, the elongation can be determined with accuracies up to 0.00015%.

The electronic digital ratio tachometer can also be used to measure changes in thickness or gauge as, for example, those accomplished by passing metal sheet through cold rolling mills. Thus, if the web is being reduced from thickness $t_1$ to thickness $t_2$ by roll mills M and M', as shown in Fig. 4 of the drawings, then, to the extent that the width of the stock remains constant, $L_2$, the speed of the stock as it is discharged from the mill, is related to the entering speed $L_1$ according to the following equation:

$$\frac{L_1}{L_2} = \frac{t_2}{t_1}$$

By arranging rolls $Q_1$ and $Q_2$ so that they are friction driven by the entering and emergent stock, respectively, their peripheral speeds would be made to equal $L_1$ and $L_2$, respectively. By equipping roll $Q_2$ with a contactor to provide a standard slow time base signal for opening and closing the starting gate and equipping roll $Q_1$ with appropriate gears and a high speed pulse tachometer generator according to the methods already described, the ratio $L_1/L_2$, and consequently the ratio $t_2/t_1$, is measurable directly by an electronic digital ratio tachometer.

The instrument is also employable to determine ribbon or sheet thickness or the diameter of wire or monofilament. This is done by passing the web partially around a roll or wheel or disc (Q) of known radius (r) and mounting a tension roll or wheel or disc (Q') in such fashion that it is friction driven by the outer surface of the web, as shown in Fig. 5 of the drawings.

Under these circumstances, the web thickness or diameter, $t$ is given by (4) $$t = R - r = r\left(\frac{R}{r} - 1\right)$$

where R is the radius of curvature of the outer surface of the web, i.e., the surface driving the tension roll Q'. The linear velocities of the outer and inner surfaces of the web, V' and V, respectively, as the web traverses the circular arc are in the same ratio as the radii, i.e., $$\frac{V'}{V} = \frac{R}{r}$$

and the peripheral velocities of rolls Q' and Q are equal respectively to V' and V. Therefore the ratio $R/r$ is determinable by measuring $V'/V$, the ratio of the roll velocities, with an electronic digital ratio tachometer and the thickness determined from Equation 4.

Because of the extensive range of the electronic system and the fact that accuracy of the apparatus of the invention is substantially independent of roll speeds, a single unit can, when employed in conjunction with simple switching circuitry, measure the speed ratios of a multiplicity of roll pairs. Apparatus embodying the invention has been used in conjunction with switching circuits to measure speed ratios of a multiplicity of roll pairs operating at speeds differing by up to about 40:1.

In addition, it has been found that, by the provision of standard switching circuitry, the apparatus of the invention may be employed to actuate an alarm system and/or operate to shut off the apparatus driving the rolls being measured for speed ratio. Also, the ratio tachometer of the invention can be made into a recording instrument by substituting for the counter described above a binary counter and digital recorder.

What is claimed is:

1. Apparatus responsive to the instantaneous ratio between variable speeds of rotating mechanical elements comprising, means for generating low speed electrical pulses having a frequency proportional to the variable speed of one rotating mechanical element; means for generating high-speed electric pulses having a frequency proportional to the variable speed of the other rotating mechanical element; first electrical circuit means responsive to the number of high-speed pulses passed thereto; and second electric circuit means, communicating between said generating means and said first electrical circuit means, employing said low-speed pulses to control the transmission of said high-speed pulses to said first electrical circuit means.

2. Apparatus for indicating with a direct reading the instantaneous ratio between variable speeds of rotating mechanical elements comprising, means for generating low speed electrical pulses having a frequency proportional to the variable speed of one rotating mechanical element; means for generating high-speed electric pulses having a frequency proportional to the variable speed of the other rotating mechanical element; first electrical circuit means for indicating the number of high speed pulses passed thereto; and second electric circuit means, communicating between said generating means and said first electrical circuit means, employing said low-speed pulses to control the transmission of said high-speed pulses to said first electrical circuit means.

3. Apparatus for indicating with a direct reading the instantaneous ratio between the variable rotational speeds of first and second rotating mechanical elements comprising, means for generating low-speed electrical pulses having a frequency proportional to the variable speed of said first rotating mechanical element; means for generating high-speed electric pulses having a frequency proportional to the variable speed of said second rotating mechanical element; electronic digital counter means for totalling and indicating the number of high-speed pulses passed thereto; and electric circuit means, communicating between each of said generating means and said counter means, employing said low-speed pulses to control the transmission of said high-speed pulses to said counter means, whereby a direct reading of the instantaneous ratio of the speeds of said second rotating element relative to said first rotating element is there indicated.

4. Apparatus in accordance with claim 3, wherein said electric circuit means communicating between said generating means and said counter means comprises a gate diode circuit employing said low-speed pulses to control the transmission of said high-speed pulses therethrough to said counter means.

5. Apparatus for indicating with a direct reading the ratio between the rotational speeds of first and second rotating mechanical elements comprising, means for generating low-speed electrical pulses having a frequency proportional to the speed of said first rotating mechanical element; means for generating high speed electric pulses having a frequency proportional to the speed of said second rotating mechanical element; electronic digital counter means for totalling and indicating the number of high-speed pulses passed thereto; high-speed diode circuit means controlling the transmission of said high-speed pulses to said counter means; low-speed diode circuit means actuated by said low-speed pulses and communicating with and controlling the transmission of said high-speed diode circuit means, whereby a direct reading of the ratio of the speeds of said second rotating element relative to said first rotating element is totalled indicated by said electronic digital counter means; and electric circuit means communicating between said electronic digital counter means and said low-speed diode circuit means for accomplishing a display period for said electronic digital counter means and for resetting said electronic digital counter means.

6. Apparatus in accordance with claim 5, wherein said electric circuit means for accomplishing a display period includes a monostable multivibrator circuit operating to close said low-speed diode circuit.

7. Apparatus in accordance with claim 5, wherein said electric circuit means for resetting said electronic digital counter means includes a blocking oscillator which serves to reset said counter to zero and then reopen said low-speed diode circuit.

References Cited in the file of this patent

UNITED STATES PATENTS

| | | |
|---|---|---|
| 2,516,189 | Dinsmore | July 25, 1950 |
| 2,740,091 | Goulding | Mar. 27, 1956 |
| 2,746,683 | McLaren | May 22, 1956 |